United States Patent [19]

Mark et al.

[11] Patent Number: 5,604,308
[45] Date of Patent: Feb. 18, 1997

[54] DATA INTERFACE FOR CLOSED-LOOP ACCELEROMETER

[75] Inventors: John G. Mark, Pasadena; Daniel P. McLane, Bell Canyon; Daniel A. Tazartes, West Hills; Stanley F. Wyse, Encino, all of Calif.

[73] Assignee: Litton Systems, Inc., Beverly Hills, Calif.

[21] Appl. No.: 589,578

[22] Filed: Jan. 22, 1996

Related U.S. Application Data

[63] Continuation of Ser. No. 129,453, Sep. 29, 1993, abandoned.

[51] Int. Cl.⁶ ........................................ G01P 15/00
[52] U.S. Cl. ................ 73/488; 73/491; 73/514.01; 73/514.17; 364/566
[58] Field of Search ................. 73/488, 491, 514.01, 73/514.17; 364/566

[56] References Cited

U.S. PATENT DOCUMENTS

| | | | |
|---|---|---|---|
| 3,877,313 | 4/1975 | Ferriss | 73/516 R |
| 4,282,470 | 8/1981 | Reynolds. | |
| 5,235,330 | 8/1993 | Sewell. | |
| 5,243,544 | 9/1993 | Schoess | 364/566 |
| 5,367,542 | 11/1994 | Guo | 375/110 |

FOREIGN PATENT DOCUMENTS

| | | |
|---|---|---|
| 8600416 | 1/1986 | WIPO. |

OTHER PUBLICATIONS

Articles: Louis E. Frenzel, Jr., *Digital Counter handbook*, pp. 237 through 241 (1981); Don Lancaster, *TTL Cookbook*, pp. 87, 284 through 291; Texas Instruments, *TTL Devices*, pp. 3–393 through 3–399 (1983).

*Primary Examiner*—Hezron E. Williams
*Assistant Examiner*—Richard A. Moller
*Attorney, Agent, or Firm*—Elliott N. Kramsky

[57] ABSTRACT

A digital circuit for adapting the output of a closed-loop accelerometer to a utilization circuit where the cycle time of the rebalance loop of the accelerometer is unrelated to the cycle time of the utilization circuit. A register receives and stores a digital value representative of measured acceleration and a bank of serially-arranged divide-by-two counters accepts the output of the rebalance loop clock. A gate arrangement makes one-by-one correlations between the states of the register and the outputs of the divide-by-two counters. A trigger circuit receives the gate outputs, providing a pulse when triggered by a downgoing edge of a square wave output of the gate array. A counter receives the pulse stream and is gated, in turn, in accordance with the cycle time of the utilization circuit so that the accelerometer data employed therein is representative of the portion of the acceleration occurring during a cycle of the utilization circuit.

16 Claims, 6 Drawing Sheets

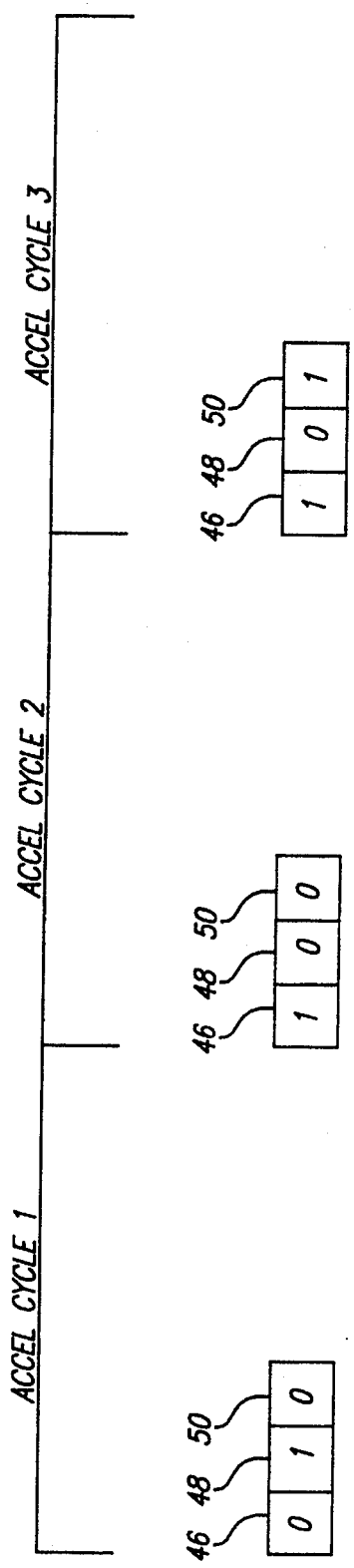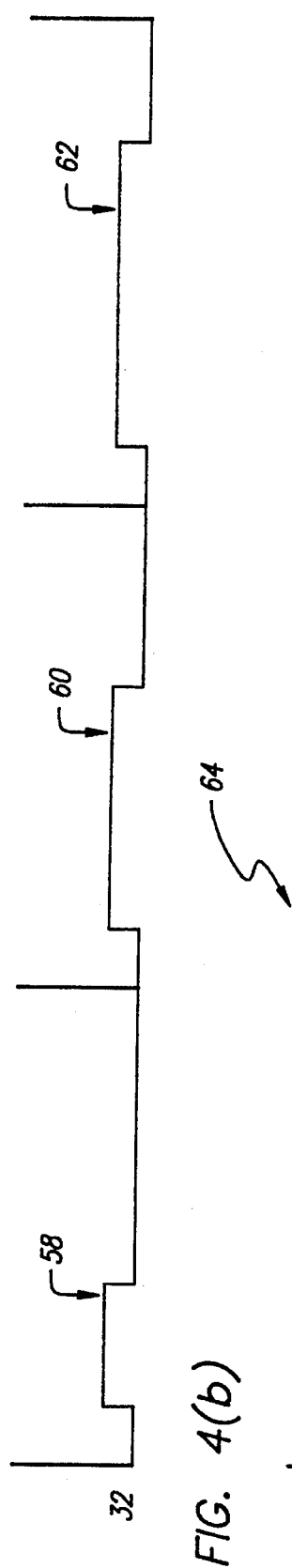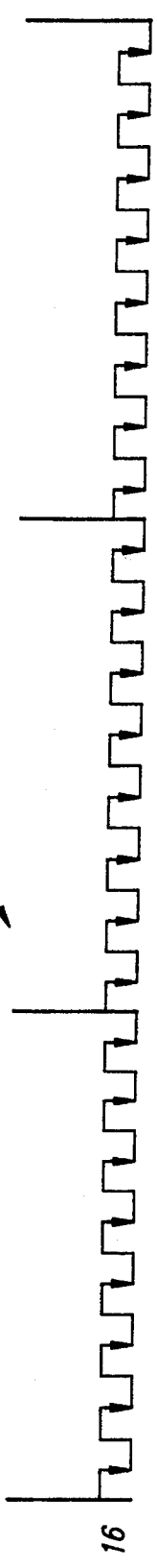

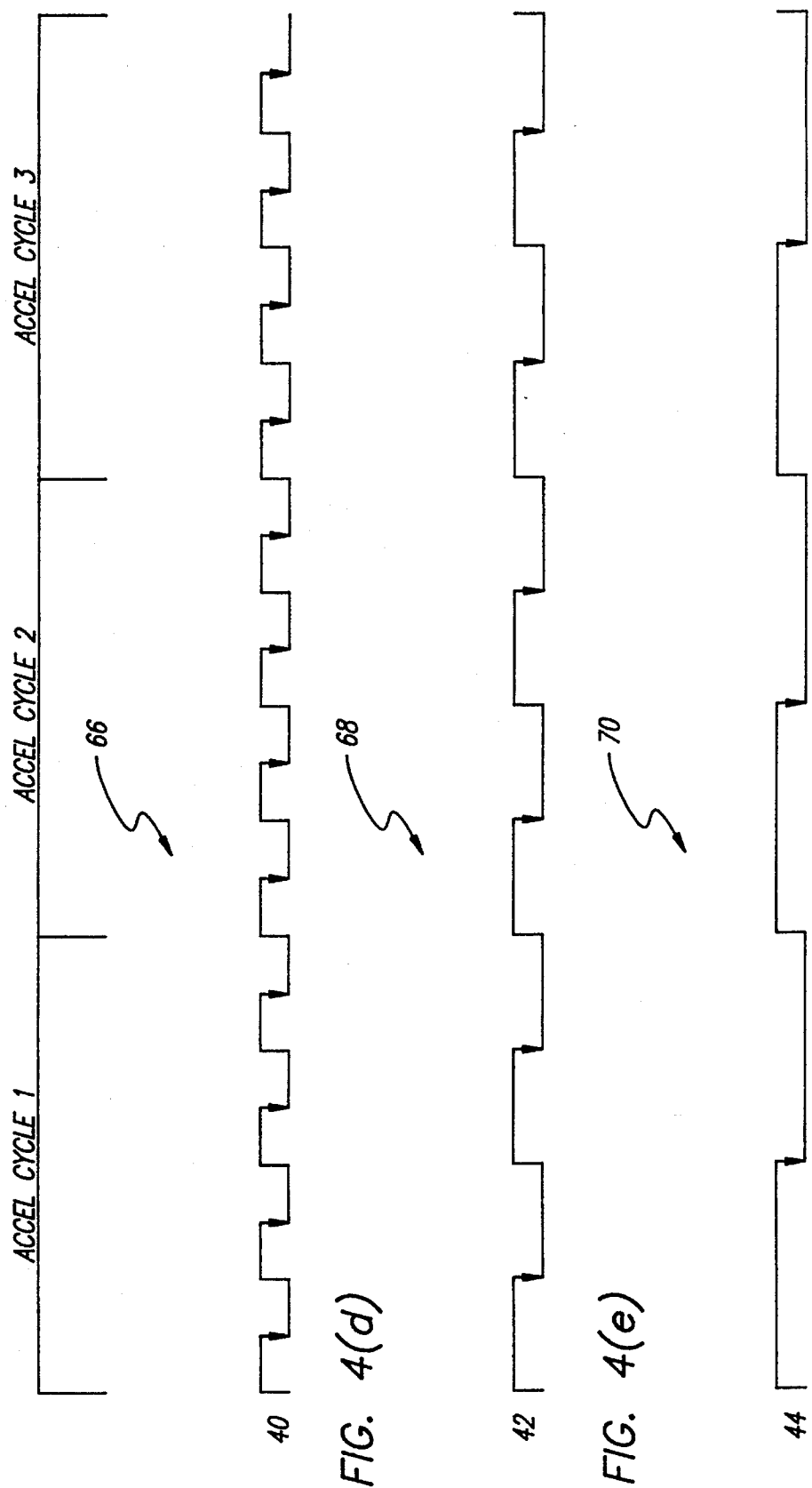

DATA INTERFACE FOR CLOSED-LOOP ACCELEROMETER

This application is a continuation of application Ser. No. 08/129,453, filed Sep. 29, 1993, now abandoned.

BACKGROUND

1. Field of the Invention

The present invention relates to apparatus and methods for facilitating utilization of the acceleration data output of a closed-loop accelerometer. More particularly, this invention pertains to apparatus for converting the acceleration output to a form that is compatible with output data rates whose frequency is unrelated to the period of the accelerometer rebalance loop.

2. Description of the Prior Art

Many accelerometers include a pendulous proofmass for sensing acceleration relative to inertial space. Motion of the proofmass relative to the body of the accelerometer (and the object attached thereto) is induced by acceleration and the displacement of the proofmass provides a measure of the acceleration force.

The displacement versus acceleration characteristic of an accelerometer may be highly nonlinear. Such nonlinearity may be due to a number of factors. For example, in a silicon accelerometer that employs a hinged floating element between a pair of conductive plates, an inverse square relationship governs the force exerted upon the pendulous mass as it travels through the gap between charged conductive plates. Nonlinearities may also be introduced through the bending characteristics of the hinges that attach the pendulous mass to the body of the accelerometer. Such second order effects can produce a nonlinear stiffness response in the bent hinge as the pendulous mass is deflected through the gap.

In order to improve the accuracy of such accelerometers, it is therefore often essential that they operate in a closed-loop fashion. The force then required to maintain the null position of the pendulous mass, rather than displacement, provides the measure of acceleration. A rebalance loop is employed for this purpose and many rebalance techniques are available. Generally, the most effective techniques employ a modulation and forcing process that takes place at a specific frequency. The output of the accelerometer may be represented by a digital value that is equal to the duty cycle of the voltage rebalance waveform in voltage rebalance schemes. Alternatively, the digital value may represent the number of charge quanta applied in charge rebalance schemes.

Systems of the above type are often subject to problems arising from inconsistencies between the accelerometer rebalance-cycle period and the data irate of the output utilization circuit. The rebalance-cycle period is fixed as is the output data rate and the resulting mismatches can lead to severe synchronization problems.

SUMMARY OF THE INVENTION

The preceding and other problems of the prior art are addressed by the present invention that provides, in a first aspect, apparatus for converting the output of a closed-loop accelerometer of the type that includes a rebalance loop of a first predetermined rebalance-cycle period to a form for use in a utilization circuit of a second predetermined cycle period. The output of the accelerometer is a value comprising a predetermined number of digital data bits representing acceleration during at least one prior accelerometer-cycle period.

In the invention, means are provided for receiving the value. Means are provided for converting the value into a stream of pulses distributed over one accelerometer-cycle period. Means are provided for sampling the stream of pulses over a second cycle period and for counting such pulses. Finally means are provided for delivering the pulse count to the utilization circuit.

In another aspect, the invention additionally provides, in addition to the previously-discussed first aspect, a register for receiving the value, which register includes a plurality of stages each arranged to store a predetermined digital data bit of the value. The means for converting, discussed with reference to the first aspect, further includes (i) a plurality of divide-by-two counters, (ii) a plurality of gates, each arranged to control the passage of a divide-by-two counter output in accordance with the state of the stage of the register, and (iii) a trigger circuit for providing pulses of predetermined duration in response to the outputs of the gates.

In yet a further aspect, there is provided in addition to the first aspect described above apparatus wherein a pulse counter is provided for counting the sample pulses. The means, discussed with reference to the first aspect, for delivering the pulse count to the utilization circuit further includes means responsive to the output of a second clock which controls the second predetermined period of the utilization circuit, for gating the counts of the counter. It is noted that, in this embodiment, the first predetermined rebalance-cycle period is controlled by a first clock while the second predetermined cycle period of the utilization circuit is controlled by a second clock.

In a first method aspect, the invention provides a method for converting the output of a closed-loop accelerometer of the type that includes a rebalance loop of a first predetermined cycle period to a form for use in a utilization circuit of a second predetermined cycle period where the output is a value representing acceleration during at least one prior accelerometer-cycle period. The value comprises a predetermined number of digital data bits.

The method is begun by receiving the value. Such value is then converted into a stream of pulses distributed over one accelerometer-cycle period. Such stream is then sampled over the second cycle period and the resulting number of pulses counted. Thereafter such pulse count is provided to the utilization circuit.

In a second method aspect, the invention provides in addition to the aforesaid first method aspect, that the value is received in a register which includes a plurality of stages, the value is arranged within the register so that predetermined digital data bits are stored in the register stages. The value is converted into a stream of pulses distributed over one accelerometer rebalance cycle period by means of an arrangement that includes (i) a plurality of divide-by-two counters, (ii) a plurality of gates, each of which is arranged to control the passage of a divide-by-two counter output in accordance with the state of the stages of the register and (iii) a trigger circuit that provides pulses of predetermined duration in response to the outputs of the gates.

As another aspect, the invention provides, in addition to the first method aspect, that the pulses are counted by means of a pulse counter. Further, the pulse count is delivered to the utilization circuit by gating the count of the counter in response to the output of a second clock. Such second clock controls the second predetermined cycle period while a first clock controls the first rebalance cycle period.

The foregoing and other features and advantages of this invention should become apparent from the detailed description that follows. Such detailed description is accompanied by a set of drawing figures. Numerals of the drawing figures, corresponding to those of the written description, point to the features of the invention. Like numerals refer to like features throughout both the drawing figures and the written text.

BRIEF DESCRIPTION OF THE DRAWINGS

FIGS. 4(a) through 4(k) are a set of waveforms for illustrating the operation of the invention with particular reference to the digital-to-pulse converter.

DETAILED DESCRIPTION

Figure 1:
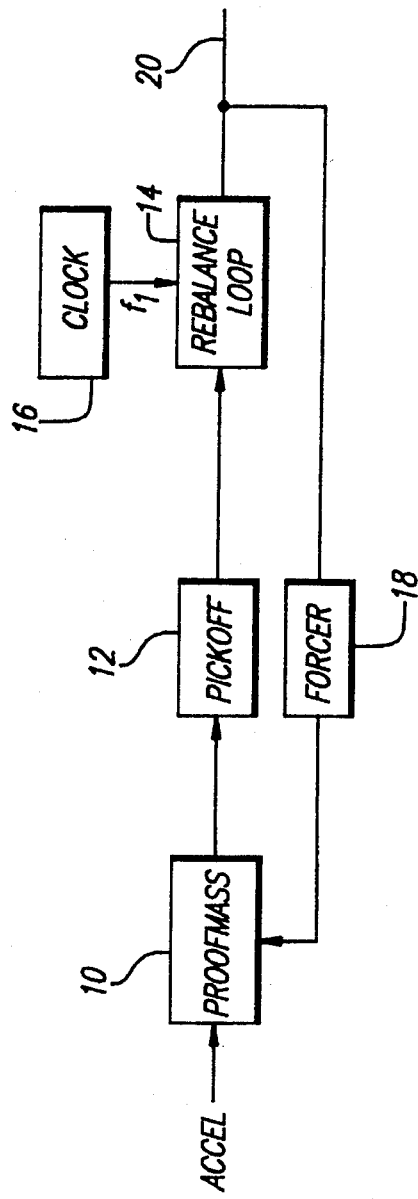
FIG. 1 is a block diagram of a closed-loop accelerometer in accordance with the prior art.

Turning now to the drawings, FIG. 1 is a block diagram of a closed-loop accelerometer arrangement in accordance with the prior art. As shown, acceleration in the direction of the sensitive axis of the device is sensed by means of a hinged pendulous mass 10, tending to cause deflection thereof from a predetermined null position. Such deflection is sensed by a pick-off arrangement 12 that may comprise any of a number of well-known optical, magnetic, electrostatic or like devices.

The pick-off arrangement 12 acts as a transducer, providing an electrical error signal to a rebalance loop 14 that is driven by a clock 16 of fixed frequency $f_1$. The rebalance loop 14 determines an appropriate rebalance force, in accordance with the error signal output of the pick-off 12, for actuating a rebalance forcer 18 which may comprise any of a number of conventional mechanical, electrical or magnetic devices to return the pendulous mass 10 to null.

The same signal that drives the forcer 18 also provides the acceleration measurement to an output port 20. Such signal contains a number in digital format (i.e., a sequence of digital data bits) representing the value of acceleration during an accelerometer rebalance-cycle. The number is descriptive of the measured force calculated by the rebalance loop 14. For example, in the event that pulse-width modulation of the pendulous mass is employed, the number would describe the duration or period of the forcing or nulling signal for driving the forcer 18.

Each accelerometer rebalance-cycle is generally divided into two periods. These include a measurement and computation period for the rebalance loop 14 to calculate the rebalance signal (equal, of course, to the measure of acceleration in a closed loop system) and a second period during which the forcer 18 is energized by the modulation signal to act upon the pendulous mass 10. The latter period may end some time prior to the end of the rebalance-cycle if, for example, the calculated duration of actuation of the forcer 18 (in a pulse-width modulated system) is less than the duration of the remaining accelerometer-rebalance-cycle. This type of cycle is repeated over and over as the pendulous mass 10 is continually returned to the null position despite the presence of an acceleration force.

As mentioned above, a problem often arises as a result of the a.c. driving of the rebalance loop 14. The rebalance-cycle of the rebalance loop 14 often differs from, and is not an integer multiple of, the output data rate of the utilization circuit (not shown in FIG. 1). Accordingly, severe synchronization problems, producing noise and jitter, will periodically occur as the utilization circuit employs the data output from the accelerometer.

Figure 2:
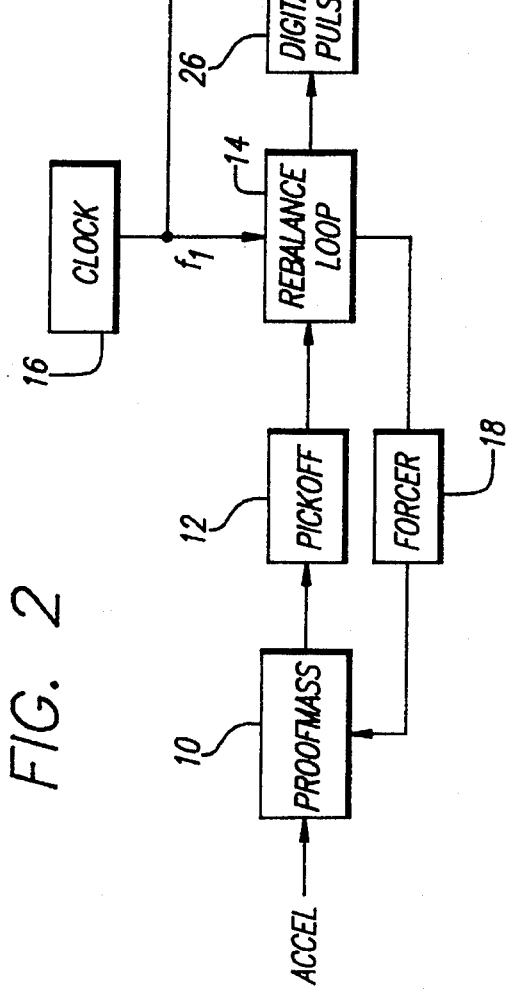
FIG. 2 is a block diagram of an accelerometer incorporating apparatus in accordance with the invention.

FIG. 2 is a block diagram of an accelerometer that includes apparatus in accordance with the invention for converting the accelerometer data output, taken periodically over predetermined accelerometer rebalance-cycles, to a form that is compatible with output utilization circuitry of a second predetermined period clocked by a clock 22 of frequency $f_2$ which may or may not equal, or bear a rational relationship to, $f_1$. Without the apparatus of the invention, described below, the acceleration data provided to the utilization circuit 24 would be inherently in error causing jitter and noise therein. Further, such error would be periodically cumulative as the disparity between the time of measurement and calculation of the acceleration data and the time of utilization thereof would periodically increase.

In the invention, apparatus is provided for re-formatting the accelerometer output data so that, regardless of the accelerometer rebalance-cycle, the utilization circuit 24 will be continually provided with data representative of only that portion of acceleration that took place during a period of length equal to the utilization cycle of the utilization circuit 24 rather than during a "complete" accelerometer rebalance-cycle.

Returning to FIG. 2, the necessary conversion of data is accomplished by means of a digital-to-pulse converter 26 that accepts the digital output of the accelerometer and transforms it into a stream of pulses equal in number to the digital accelerometer output and spread over one accelerometer rebalance-cycle. The output of the converter 26 is then fed to a counter 28 through a high speed system sampling switch 30 controlled by the utilization circuit clock 22. Upon passage of the pulse stream to the counter 28, a digital word or count is then generated. This digital value is provided to the utilization circuit 24 by a sampling means 29 controlled by the output of a divide-by-N counter 31. The divide-by-N counter 31 establishes the data rate of the utilization circuit 24 by dividing the clock 22 frequency $f_2$ by a predetermined value N. When closed (upon arrival of an "end of cycle" signal from the counter 31) the switch 29 latches the state of the counter 28, and provides the contents of counter 28 to the utilization circuit 24. After such instantaneous closure, the switch 29 returns to an open state, thereby resetting the counter 28.

Figure 3:
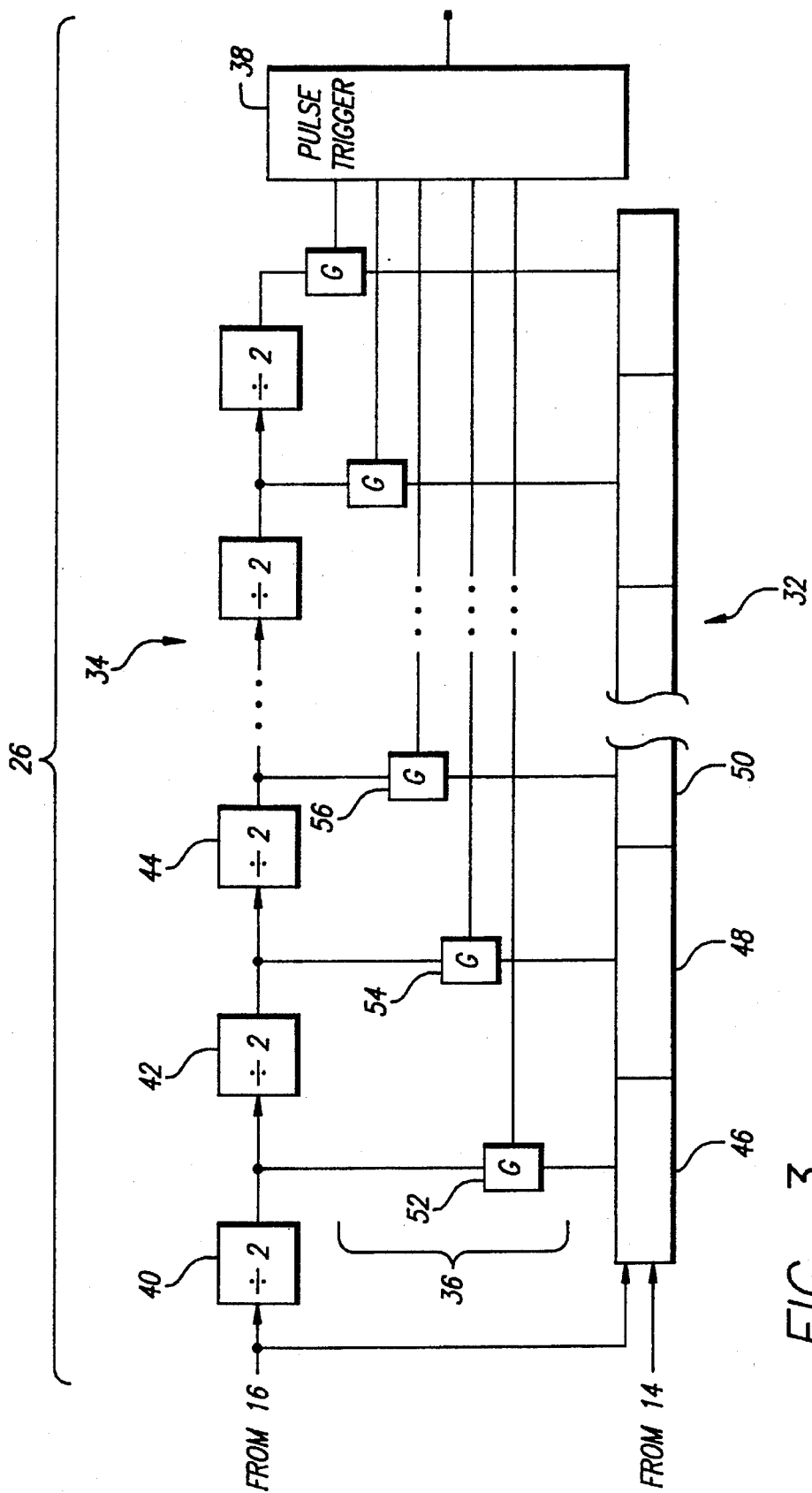
FIG. 3 is a schematic diagram of a converter apparatus in accordance with the invention.

FIG. 3 is a schematic diagram of the digital-to-pulse converter 26 that is incorporated within the apparatus of the invention. The converter 26 includes a register 32 that is clocked by the accelerometer clock 16 and receives the digital words from the rebalance loop 14 that represent the signal applied to the forcer 18 and, consequently, the value of acceleration measured during the prior accelerometer rebalance-cycle.

A bank of divide-by-two counters 34 receives the output of the accelerometer clock 16. As will be discussed below, the plurality of counters is arranged serially to accept the output of the clock 16 and thereby to provide a plurality of signals of differing frequencies which, when gated (through a network of gates 36) by the digital word stored in the register 32 on a stage-by-stage basis, generates the signal for actuating a trigger circuit 38 that outputs the stream of pulses to the switch 30 of FIG. 2.

A discussion of the operation of the digital-to-pulse converter 26 will follow in which reference is simultaneously made to the structure illustrated in FIG. 3 and to the set of waveforms shown in FIGS. 4(a) through 4(k). More particularly, the discussion of the invention will be simplified by considering only limited portions of the register 32, the bank of counters 34 and the gate network 36. In the example that follows, reference will be made to the initial divide-by-two counters 40, 42 and 44 of the bank 34, stages 46, 48 and 50 of the register 32 and gates 52, 54 and 56 of the gate array 36 only. However, it will be evident from the discussion that the mode of operation of the digital-to-pulse converter 26 can be straightforwardly and readily extended to registers, gate arrays and banks of counters of greatly increased sizes, provided that equal numbers of register stages, gates and counters are available for effecting the processes illustrated of course, "excess" register stages and the like, though non-functional in terms of the operation of the invention, may be present in the equipment actually employed for performing the function of the invention.

FIGS. 4(a) through 4(k) provide an illustration of the manner in which the value representing force as determined by the rebalance loop 14 is converted by the digital-to-pulse converter 26 to a form that is compatible with the period of the utilization circuit 24 to thereby eliminate the problems of noise and jitter due to mismatch between the accelerometer rebalance-cycle and the period of the utilization circuit 24. (For purposes of illustration only, it shall be assumed that the clock frequencies $f_1$ and $f_2$ are identical. This assumption affects only the portion of the discussion that accompanies FIG. 4(k) and it will be readily appreciated that the relationship between the clock frequencies $f_1$ and $f_2$ is not central to the application of the invention, it being understood that the need for the invention arises from a mismatch between the accelerometer rebalance-cycle and the period of the utilization circuit.)

Since the sets of waveforms, for purposes of clarity, relate solely to the first three elements of the register 32, the counter bank 34 and the gate array 36, in FIG. 4(a) there is illustrated the three states of the stages 46, 48 and 50 of the register 32 taken over three consecutive rebalance-cycles. Each state comprises a number defining the value of modulation calculated by the rebalance loop 14 and applied by the forcer 18 to the pendulous mass 10. The three modulation values are "2", "4" and "5" respectively and the corresponding binary representations thereof, loaded into the first three stages of the register 32, are shown in FIG. 4(a).

Assuming that pulse-width modulation is employed by the closed loop system, each modulation value defines the duration of the driving pulse applied to the forcer 18. The waveforms of FIG. 4(b) illustrate the modulation pulses 58, 60 and 62 for driving the forcer 18 during accelerometer rebalance-cycles 1, 2 and 3 respectively. The three pulses represent at the same time the calculated acceleration force of the closed-loop system. It may be noted that, for each accelerometer rebalance-cycle, there exists an initial "dead" period for computation of modulation that precedes the application of the modulation signal to the forcer 18.

The waveform 64 of FIG. 4(c) represents the output of the accelerometer clock 16 which, as mentioned earlier, is of frequency $f_1$ and period $1/f_1$. In the illustrated example, the period of the clock 16 is one-eight that of an accelerometer rebalance-cycle as there exists eight clock pulses per acceleration rebalance-cycle.

The waveforms 66, 68 and 70 shown in FIGS. 4(d) through 4(f) represent the outputs of the divide-by-two counters 40 through 44 respectively. Each of such serially-arranged counters divides the frequency of a signal originating with the output of the clock 16 in half, such division beginning with the counter 40. The frequencies of the resultant waveforms 66, 68 and 70 output by the counters 40, 42 and 44 are 4, 2 and 1 square waves per accelerometer rebalance-cycle respectively. The waveform output by each of the counters comprises a regularly-spaced pattern. Downwardly-directed arrows at the trailing edge of each square wave of FIGS. 4(d) through 4(f) indicate the points in time for actuating the trigger circuit 38 to output a pulse (discussed below).

Figure 4G:
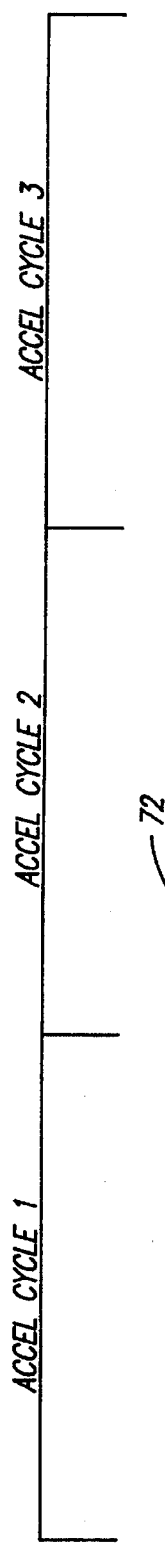
Figure 4H:
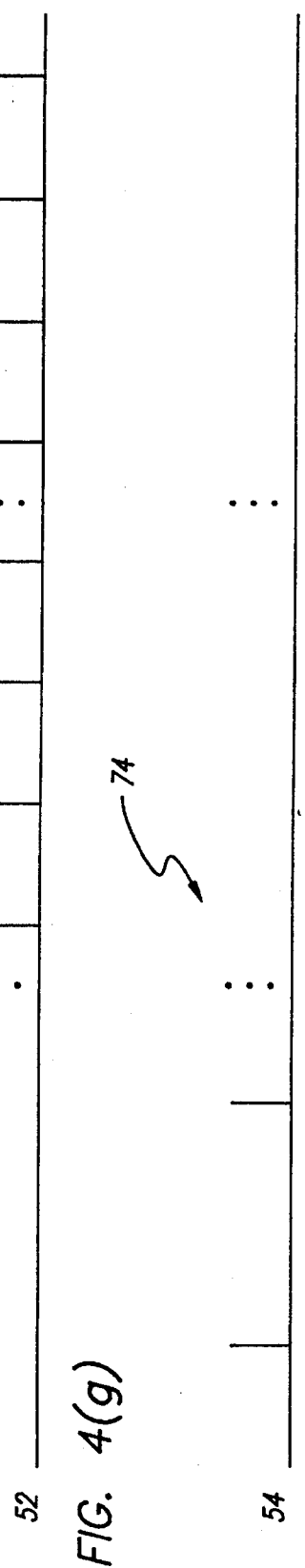
Figure 4I:
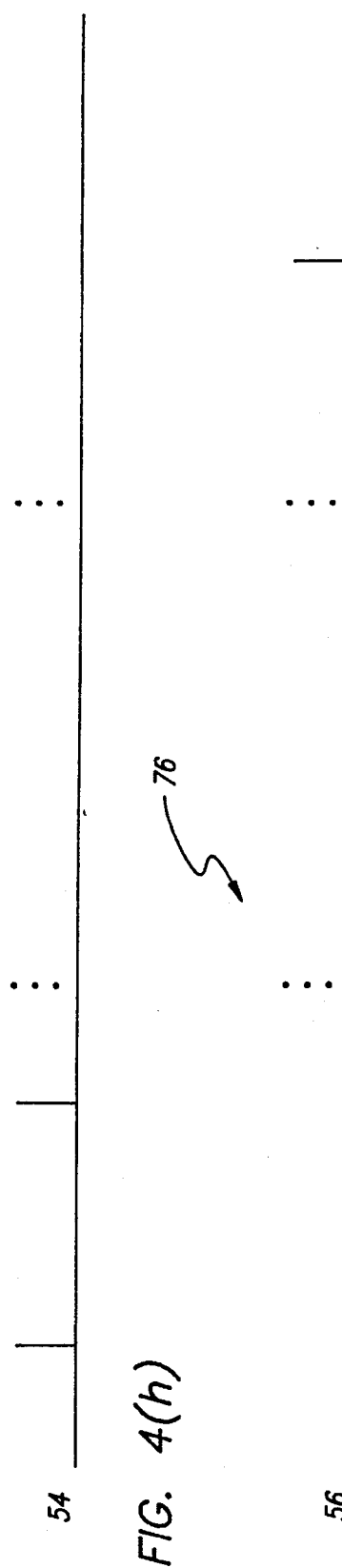

FIGS. 4(g), 4(h) and 4(i) comprise a set of waveforms that illustrate the outputs of the gates 52, 54 and 56 respectively. The sets of vertical lines 72 and 74 of FIGS. 4(g) and 4(h) along with the single vertical line 76 of FIG. 4(i) illustrate and locate the downgoing or triggering edges of pulses transmitted through the gates 52, 54 and 56 respectively. (For purposes of clarity, only the downgoing or triggering edge of each pulse transmitted through a gate is shown since, as discussed above, only downgoing edges serve to actuate the trigger 38 to output individual pulses of a pulse train for application to the counter 28 shown in FIG. 2.) Referring back to FIG. 3, each of the gates 52, 54 and 56 accepts both an output stream from the bank of counters 34 and a state from a stage of the register 32, each gate defining a unique correspondence therebetween. As such, the gate 52 accepts the outputs of the "first" divide-by-two counter 40 and the "first" register stage 46, the gate 54 accepts the outputs of the "second" divide-by-two counter 42 and the "second" register stage 48 and the gate 56 accepts the outputs of the "third" divide-by-two counter 44 and the "third" register stage 50.

Figure 4J:
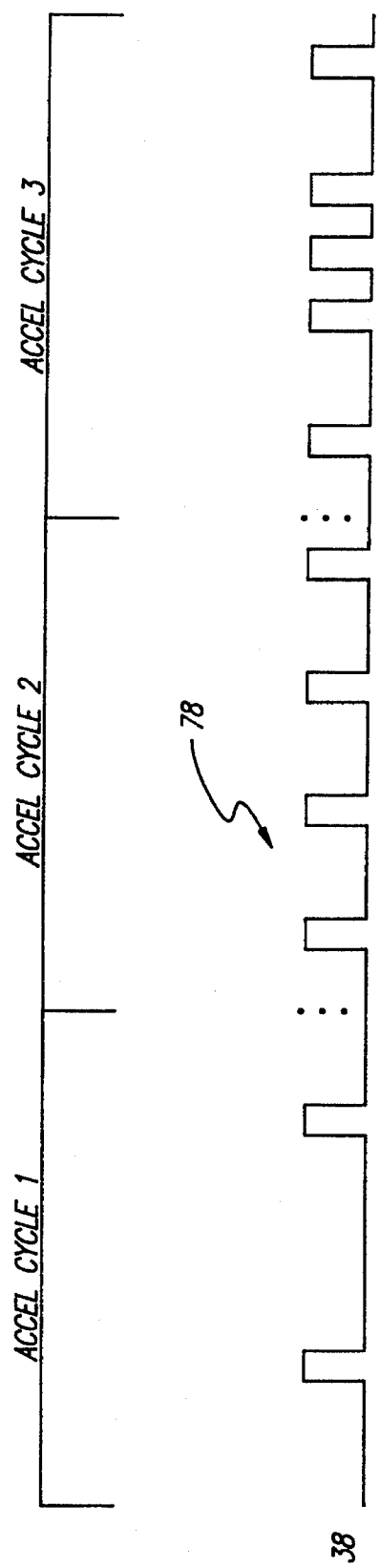

The pulse waveform 78 of FIG. 4(j) indicates the stream of pulses output by the pulse trigger 38. It is noted that, during accelerometer rebalance-cycle 1, the gate 52 receives only a "low" (or "0") output from the stage 46 of the register 32 which, for purposes of convention, blocks the output of the associated divide-by-two counter 40. This is in contrast to the operation of the gate 52 during accelerometer rebalance-cycle 2. During that cycle, a "high" or "1" signal from the stage 46 of the register 32 gates through the output of the divide-by-two counter 40. As a result, four pulse-triggering, downgoing edges from the square waveform illustrated in FIG. 4(d) pass through the gate 52 during that rebalance-cycle and, for the same reason, another four pulse-triggering edges from the waveform of Figure 4(d) pass through the gate 52 during accelerometer rebalance-cycle 3.

Referring to FIG. 4(h) which illustrates the output of the gate 54, two downgoing, pulse-triggering edges, taken from the output of the divide-by-two counter 42, pass through that gate during accelerometer rebalance-cycle 1 as a consequence of the high state of the stage 48 of the register 32. The low states of that stage during accelerometer rebalance-cycles 2 and 3 act to block passage of the waveform output, and, consequently, pulse-triggering-edges, from the divide-by-two counter 42 during those latter cycles. Finally, referring to 4(i), the low states of the stage 50 block the passage of pulse-triggering, downgoing edges through the gate 56 during accelerometer rebalance-cycles 1 and 2. However, the high state of the stage 50 during accelerometer rebalance-cycle 3 controls the gate 56 to output a single downgoing pulse-triggering edge from the counter 44 (waveform illustrated in FIG. 4(f)) during accelerometer rebalance-cycle 3.

The above-identified downgoing pulse-triggering edges are applied in parallel to the pulse trigger 38. As shown in FIG. 4(j) each of these edges causes the trigger circuit 38 to output a pulse. As can be seen by counting the number of pulses in FIG. 4(j), two (2) pulses appear at the output of the trigger circuit 38 during accelerometer rebalance-cycle 1 (corresponding to the binary value (010) stored in the register 32 during the accelerometer rebalance-cycle). Examining accelerometer rebalance-cycle 2, a total of four pulses is output, corresponding to the binary "100" stored in the register 32 during that rebalance-cycle. Finally, a total of five (5) pulses is output from the trigger circuit 38 during accelerometer rebalance-cycle 3, corresponding to the binary value "101" hat is stored in the register 32 during the rebalance-cycle.

Figure 4K:
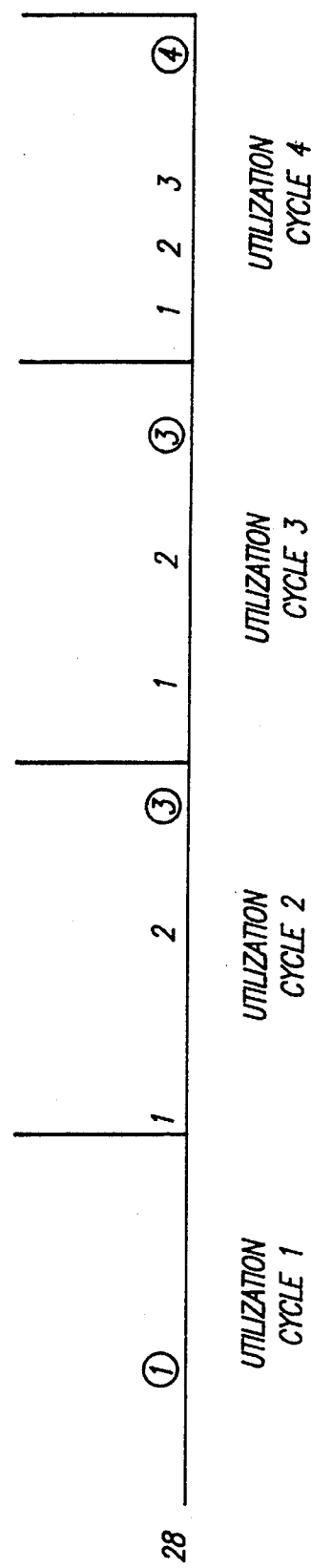

The accumulation of the counter 28 in response to the input of pulses from the trigger circuit 38 is illustrated in FIG. 4(k). The pulses output by the trigger circuit 38 of the digital-to-pulse converter 26 are fed to the counter 28 through the high speed system sampling clock 30. The rebalance-cycle of the utilization circuit 24 is controlled by the combination of the utilization circuit clock 22 and the divide-by-N counter 31. A utilization circuit 24 period equal to six times the clock period (N=6) is employed in the example. The sequence of numbers written between the lines that define the boundaries of the utilization circuit cycles indicate the instantaneous count of the counter 28 with circled numbers denoting the count values actually gated through the switch 29 at the time that an "end of cycle" signal arrives from the divide-by-N counter 31.

As can be seen from the above, the digital-to-pulse converter 26, in conjunction with subsequent apparatus converts the accelerometer measurements taken over an eight clock period accelerometer rebalance-cycle to a six clock pulse utilization circuit period. In the process, the accelerometer rebalance-cycle sequence "2", "4", "5" is converted to the utilization circuit sequence "1", "3", "3", "4". In order to compare the values it should be considered that, ideally, the values computed in each accelerometer rebalance-cycle should be uniformly spread over the entire cycle. Thus, for example, in accelerometer rebalance-cycle 1, there are two (2) counts per eight (8) clocks or ¼ count per clock. In accelerometer rebalance-cycle 2, there are four (4) counts per eight (8) clocks or ½ count per clock. Finally, in accelerometer rebalance-cycle 3, there are five (5) counts per eight (8) clocks or ⅝ count per clock.

Utilization circuit period 1 encompasses the first six (6) clocks of accelerometer rebalance-cycle 1. Thus, the desired value is 6×¼=1.5 counts. This may be compared to the actual count (1) obtained. Utilization rebalance-cycle 2 overlaps two (2) clocks from accelerometer rebalance-cycle 1 and four (4) clocks from accelerometer rebalance-cycle 2. Thus, the desired value is 2×(¼)+4×(½)=2.5 counts which is compared to the three (3) counts actually obtained. Utilization cycle 3 spans four (4) clocks from accelerometer circuit period 3 and two (2) clocks from accelerometer rebalance 4. The desired value is 4×(½)+2×⅝=3.25 counts in contrast to the three (3) counts actually obtained. Finally, utilization circuit period 4 spans six (6) clocks from accelerometer rebalance-cycle 4 leading to a desired value of 6×⅝=3.75 counts. This is to be compared to the four (4) counts that were obtained. In all cases, the value obtained is within one count of the desired value. This is a significant property of the digital to pulse conversion scheme of the invention.

Thus it is seen that the present invention provides a data interface that readily overcomes problems inherent in the provision of data generated by a closed-loop accelerometer to a utilization circuit. The use of such an interface significantly reduces problems of noise and jitter that arise from mismatches between the cycle time of the accelerometer rebalance loop and the cycle time of the utilization circuit. By employing the data conversion apparatus and method of the invention one is able to eliminate the need for synchronous operation while retaining most of the benefits of such operation. Drastic, intrinsic modifications of existing equipment are avoided as well as significant costs, both economic and in terms of lost performance value.

While the invention has been described with reference to its presently preferred embodiment, it is not limited thereto. Rather, this invention is limited only insofar as it is defined by the following set of patent claims and includes within its scope all equivalents thereof.

What is claimed is:

1. Apparatus for converting the output of a closed-loop accelerometer of the type that includes a digital rebalance loop having an associated rebalance-cycle period to a form for use in a digital utilization circuit having an associated utilization cycle period and in which the accelerometer output is a value in the form of a first digital word representing acceleration during an accelerometer rebalance-cycle period, said apparatus comprising, in combination:

a) means for receiving said first digital word and converting said first digital word into a stream of pulses symmetrically distributed with respect to time over one accelerometer rebalance-cycle period;

b) means for sampling said stream of pulses over said utilization cycle period;

c) means for counting said symmetrically-distributed pulses to generate a second digital word; and d) means for applying said second digital word to said utilization circuit.

2. Apparatus as defined in claim 1 wherein said rebalance loop is synchronized to a first clock and said utilization circuit is synchronized to a second clock.

3. Apparatus as defined in claim 2 wherein said means for receiving said value further comprises:

a) a register; and b) said register includes a plurality of register stages, each of said stages being capable of two states and each being arranged to store a predetermined digital data bit of said value as one of said two states.

4. Apparatus as defined in claim 3 wherein said means for receiving and converting said first digital word includes a plurality of divide-by-two counters.

5. Apparatus as defined in claim 4 further including a plurality of gates, each of said gates being arranged to control passage of a divide-by-two counter output in accordance with the state of a stage of said register.

6. Apparatus as defined in claim 5 further characterized in that:

a) said divide-by-two counters are cascaded together and b) the first of said cascaded arrangement of divide-by-two counters receives the output of said first clock.

7. Apparatus as defined in claim 6 wherein said means for receiving and converting said first digital word further includes a trigger circuit arranged to receive the outputs of said gates.

8. Apparatus as defined in claim 7 wherein said trigger circuit provides pulses of predetermined duration in response to the outputs of said gates.

9. Apparatus as defined in claim 8 further including a pulse counter for receiving the output of said trigger circuit.

10. Apparatus as defined in claim 9 wherein said means for applying said second digital word further comprises:

a) means for detecting the output of said pulse counter; and b) the state of said means is responsive to the output of said second clock.

11. Apparatus as defined in claim 8 wherein said means for applying said second digital word further comprises:
   a) means for sampling;
   b) means responsive to said second clock for measuring said predetermined utilization cycle period; and
   c) said means for sampling is responsive to the output of said means for measuring said predetermined utilization cycle period.

12. Apparatus for converting the output of a closed-loop accelerometer of the type that includes a digital rebalance loop having an associated rebalance-cycle period to a form for use in a digital utilization circuit having an associated utilization cycle period and in which the accelerometer output is a value in the form of a first digital word representing acceleration during an accelerometer rebalance-cycle period, said apparatus comprising, in combination:
   a) a register for receiving said first digital word, said register including a plurality of register stages, each of said stages being capable of two states and each being arranged to store a predetermined element of said first digital word;
   b) means for converting said first digital word into a stream of pulses symmetrically distributed over one accelerometer rebalance-cycle period, said means including (i) a plurality of divide-by-two counters, (ii) a plurality of gates, each of said gates being arranged to control the passage of a divide-by-two counter output in accordance with the state of a stage of said register, and (iii) a trigger circuit for providing pulses of predetermined duration in response to the outputs of said gates;
   c) means for sampling said stream of symmetrically-distributed pulses over said utilization cycle period;
   d) means for counting said sampled pulses to generate a second digital word; and
   e) means for applying said second digital word to said utilization circuit.

13. Apparatus for converting the output of a closed-loop accelerometer of the type that includes a digital rebalance loop having an associated rebalance-cycle period synchronized to a first clock to a form for use in a digital utilization circuit having an associated utilization cycle period synchronized to a second clock and in which the accelerometer output is a value in the form of a first digital word representing acceleration during at least one accelerometer rebalance-cycle period, said apparatus comprising, in combination:
   a) means for receiving said first digital word and converting said first digital word into a stream of pulses symmetrically distributed with respect to time over an accelerometer rebalance-cycle period;
   b) means for sampling said stream of symmetrically-distributed pulses over said utilization period;
   c) a pulse counter for counting said sampled pulses to generate a second digital word; and
   d) means for applying said second digital word to said utilization circuit, said means being synchronized to the output of said second clock.

14. A method for converting the output of a closed-loop accelerometer of the type that includes a digital rebalance loop having an associated rebalance-cycle period to a form for use in a digital utilization circuit having an associated utilization cycle period and in which the accelerometer output is a value in the form of a first digital word representing acceleration during at least one prior accelerometer rebalance-cycle period, said method comprising the steps of:
   a) receiving said first digital word; then
   b) converting said first digital word into a stream of pulses symmetrically distributed with respect to time over an accelerometer rebalance-cycle period; then
   c) sampling said stream of pulses over said utilization cycle period; and
   d) counting said sampled pulses to generate a second digital word; and then
   e) applying said second digital word to said utilization circuit.

15. A method for converting the output of a closed-loop accelerometer of the type that includes a digital rebalance loop having an associated rebalance-cycle period to a form for use in a digital utilization circuit having an associated utilization cycle period and in which the accelerometer output is a value in the form of a first digital word representing acceleration during a prior accelerometer rebalance-cycle period, said method comprising the steps of:
   a) receiving said first digital word in a register that includes a plurality of register stages; then
   b) converting said first digital word into a stream of pulses distributed symmetrically over an accelerometer rebalance-cycle period; then
   c) sampling said stream of symmetrically-distributed pulses over said utilization cycle period; and
   d) counting said sampled pulses to generate a second digital word; and then
   e) applying said second digital word to said utilization circuit.

16. A method for converting the output of a closed-loop accelerometer of the type that includes a digital rebalance loop having an associated rebalance-cycle period synchronized to a first clock to a form for use in a digital utilization circuit having an associated utilization cycle period controlled by a second clock and in which the accelerometer output is a value in the form of a first digital word representing acceleration during a prior accelerometer rebalance-cycle period, said method comprising the steps of:
   a) receiving said first digital word; then
   b) converting said first digital word into a stream of pulses symmetrically distributed with respect to time; then
   c) sampling said stream of symmetrically-distributed pulses over said utilization cycle period; and
   d) counting said symmetrically-distributed pulses to generate a second digital word; and then
   e) applying said second digital word to said utilization circuit.

* * * * *